US010637654B2

(12) United States Patent
Lu et al.

(10) Patent No.: US 10,637,654 B2
(45) Date of Patent: Apr. 28, 2020

(54) SMART KEY DEVICE AND WORKING METHOD THEREOF

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/137,385

(22) Filed: Sep. 20, 2018

(65) Prior Publication Data

US 2019/0028269 A1    Jan. 24, 2019

Related U.S. Application Data

(63) Continuation of application No. PCT/CN2017/073244, filed on Feb. 10, 2017.

(30) Foreign Application Priority Data

May 27, 2016   (CN) .......................... 2016 1 0366154

(51) Int. Cl.
*H04L 9/08* (2006.01)
*H04L 9/32* (2006.01)

(52) U.S. Cl.
CPC .......... *H04L 9/0825* (2013.01); *H04L 9/0822* (2013.01); *H04L 9/3234* (2013.01);
(Continued)

(58) Field of Classification Search
CPC .............. H04L 63/0853; H04L 9/0891; G06Q 20/0855
(Continued)

(56) References Cited

U.S. PATENT DOCUMENTS

2005/0123142 A1* 6/2005 Freeman ............... H04L 9/0891
380/277
2012/0323717 A1* 12/2012 Kirsch ............... G06Q 20/0855
705/26.1
(Continued)

FOREIGN PATENT DOCUMENTS

CN        101232380 A      7/2008
CN        103457939 A     12/2013
(Continued)

OTHER PUBLICATIONS

The International Search Report of corresponding International PCT Application No. PCT/CN2017/073244, dated Apr. 28, 2017.
(Continued)

*Primary Examiner* — Bryan F Wright
(74) *Attorney, Agent, or Firm* — J.C. Patents

(57) ABSTRACT

Provided are a smart key device and a working method. When a register requesting command is received, the smart key device obtains a key handle, an authentication certificate and a first signing result and forms a response data of the register requesting command according to the second key pair, the key handle, the authentication certificate and the first signing result; when an authentication requesting command is received, the smart key device determines a current user legitimated by authenticating according to the authentication requesting command, obtains a second signing result according to the authentication requesting command and a current authenticating times, and forms a response data of the authentication requesting command according to the second signing result and the current authenticating times. Fast identity authentication can be implemented and security of online transaction can be enhanced by the present invention.

20 Claims, 6 Drawing Sheets

(52) U.S. Cl.
CPC .......... *H04L 9/3247* (2013.01); *H04L 9/3268* (2013.01); *H04L 2209/805* (2013.01)

(58) Field of Classification Search
USPC .......................................................... 726/3
See application file for complete search history.

(56) References Cited

U.S. PATENT DOCUMENTS

| | | | |
|---|---|---|---|
| 2018/0115897 A1* | 4/2018 | Einberg | H04L 63/0853 |
| 2018/0213405 A1* | 7/2018 | Jung | H04L 63/0853 |

FOREIGN PATENT DOCUMENTS

| | | |
|---|---|---|
| CN | 103942690 A | 7/2014 |
| CN | 104301113 A | 1/2015 |
| CN | 105162785 A | 12/2015 |
| CN | 105184566 A | 12/2015 |
| CN | 105827655 A | 8/2016 |

OTHER PUBLICATIONS

The Chinese First Examination Report of corresponding China patent application No. 201610366154.1, dated Jun. 29, 2018.
The Chinese Search Report of corresponding Chinese application No. 201610366154.1.

\* cited by examiner

# SMART KEY DEVICE AND WORKING METHOD THEREOF

CROSS REFERENCE TO RELATED APPLICATION

This application is a continuation of International Application No. PCT/CN2017/073244, filed on Feb. 10, 2017, which claims priority to Chinese Patent Application No. 201610366154.1, filed on May 27, 2016. The disclosures of the aforementioned applications are hereby incorporated by reference in their entireties.

TECHNICAL FIELD

The present invention relates to the field of information security, in particularly to a smart key device and a working method thereof.

BACKGROUND

With fast development of the internet and e-business, the amount of money involved in online transaction is getting larger and larger, network information security issue becomes more and more serious, and consumers are also paying more attention on security problem of online transaction. Quick payment, which is widely used in the prior art, adopts short message authentication code of a mobile phone to authenticate identification of a transaction user. If the user loses his or her mobile phone, a malicious person may conduct online transaction in the name of the user by using this mobile phone, which will bring unrecoverable loss to the user. Thus, adopting the short message authentication code to conduct quick payment in the prior art is very unsafe. Besides, it is very inconvenient to enter a short message for each transaction.

In order to enhance security of online transaction, the present invention provides a method for quick authenticating identification implemented based on a smart key device to solve the problem in the prior art.

SUMMARY

In order to solve the technical problem in the prior art, the present invention provides a smart key device and a working method thereof.

A technical solution of the present invention is as follows:

a smart key device disclosed by the present invention, including: a storing module, a first receiving module, a first parsing module, a first forming module, a second forming module, a third forming module, a first responding module, a second receiving module, a second parsing module, a determining module, a signing module, a second responding module and a third responding module; where, the storing module is configured to store a first key pair, an encryption key and a decryption key;

the first receiving module is configured to receive a register requesting command issued by a host and trigger the first parsing module;

the first parsing module is configured to parse the register requesting command received by the first receiving module to obtain a first data and a second data, generate a second key pair, and trigger the first forming module, the second forming module and the third forming module;

the first forming module is configured to form a data to be encrypted according to the second data obtained by parsing by the first parsing module and a private key of the second key pair generated by the first parsing module, and use an encryption key stored in the storing module to encrypt the data to be encrypted to obtain a key handle; and the second forming module is configured to use a private key of a preset key pair to sign a preset certificate template content to obtain a signing value, and form an authentication certificate according to the signing value and the preset certification template content;

preferably, the certificate template content includes a certificate sequence number and the public key of the second key pair.

The third forming module is configured to form a first data to be signed according to the first data and the second data obtained by parsing by the first parsing module, the key handle obtained by the first forming module and a public key of the second key pair generated by the first parsing module, and use a private key of the first key pair stored in the storing module to sign the first data to be signed to obtain a first signing result;

the first responding module is configured to form a response data of the register requesting command according to the second key pair generated by the parsing module, the key handle obtained by the first forming module, the authentication certificate obtained by the second forming module and the first signing result obtained by the third forming module, and return the response data to the host;

the second receiving module is configured to receive an authentication requesting command issued by the host and trigger the second parsing module;

the second parsing module is configured to parse the authentication requesting command received by the second receiving module to obtain a first parameter, a second parameter and a key handle, and use the decryption key stored by the storing module to decrypt the key handle to obtain first decryption data and second decryption data;

the determining module is configured to determine whether a current user is legitimate according to the first parameter obtained by parsing by the second parsing module and the first decryption data obtained by decrypting by the second parsing module, if yes, trigger the signing module, otherwise, trigger the third responding module.

the signing module is configured to obtain a current authenticating times, form a second data to be signed according to the authenticating times, the first parameter and the second parameter which are obtained by parsing by the second parsing module, use the second decryption data obtained by decrypting by the second parsing module to sign the second data to be signed to obtain a second signing result, and trigger the second responding module;

the second responding module is configured to form a response data of the authentication requesting command according to the authenticating times and the second signing result which are obtained by the signing module and return the response data to the host;

the third responding module is configured to form the response data of the authentication requesting command according to preset byte-code and return the response data to the host.

Further, the smart key device further includes a generating module;

the generating module is configured to generate the first key pair, the encryption key and the decryption key and store the first key pair, the encryption key and the decryption key in the storing module when the smart key device is powered up for the first time, and is further configured to set an initial value of the authenticating times when the smart key device is powered up for the first time;

Or, the generating module is configured to, when the smart key device is powered up for the first time, generate the encryption key and the decryption key and store the encryption key and the decryption key in the storing module, and is further configured to set the initial value of the authenticating times when the device is powered up for the first time;

the second responding module is further configured to update the authenticating times.

Further, the smart key device further includes a third receiving module, the third receiving module is configured to receive an application selecting command or a version number obtaining command which are issued by a host, and return preset response data to the host.

Further, the smart key device further includes a random number generating module, the random number generating module is configured to generate a random number;

Correspondingly, the second forming module is specifically configured to form the data to be encrypted according to the second data obtained by the first parsing module, the private key of the second key pair generated by the first parsing module and the random number generated by the random number generating module, and use the encryption key stored in the storing module to encrypt the data to be encrypted to obtain the key handle.

In addition, the present invention provides a working method of a smart key device, which includes: when the smart key device receives a register requesting command issued by a host, the smart key device executes:

Step A1, parsing the register requesting command to obtain a first data and a second data and generating a second key pair;

Preferably, before step A1, further includes: determining whether a register is permitted, if yes, executing step A1, otherwise, returning error information to the host.

Step A2, forming data to be encrypted according to a private key in the second key pair and the second data, using a stored encryption key to encrypt the data to be encrypted to obtain a key handle; and using a private key of a preset key pair to sign stored certification template content to obtain a singing value and forming an authentication certificate according to the signing value and the certificate template content;

Step A3, forming a first data to be signed according to the first data, the second data, the key handle and a public key of the second key pair, and using a private key of the stored first key pair to sign the first data to be signed to obtain a first signing result;

Step A4, forming a response data of the register requesting command according to the second key pair, the key handle, the authentication certificate and the first signing result and returning the response data to the host;

when the smart key device receives an authentication requesting command issued from the host, performs:

Step B1, parsing the authentication requesting command to obtain a first parameter, a second parameter and a key handle, and using a stored decrypting key to decrypt the key handle to obtain a first decryption data and a second decryption data;

Step B2, determining whether the current user is legitimate according to the first parameter and the first decryption data, if yes, executing step B3, otherwise, executing step B5;

Specifically, determines whether the first decryption data and the first parameter are identical, if yes, the current user is legitimate and executes step B3, otherwise, the current user is not legitimate, executes step B5.

Step B3, obtaining a current authenticating times, forming a second data to be signed according to the first parameter, the second parameter and the authenticating times, and using the second decryption data to sign the second data to be signed to obtain a second signing result;

Preferably, before step B3, further includes: determining whether authentication is permitted, if yes, executing step B3, otherwise, returning error information to the host.

Step B4, forming the response data of the authentication requesting command according to the authenticating times and the second signing result, and returning to the host;

Step B5, forming the response data of the authentication requesting command according to preset error byte-code and returning the response data to the host.

The above mentioned method further includes: when the smart key device is powered up for the first time, generating and storing the first key pair, the encryption key and the decryption key, and setting an initial value of the authenticating times;

Or further includes: when the smart key device is powered up for the first time, generating and storing the encryption key and the decryption key, setting an initial value of the authenticating times; and the first key pair is pre-stored in the smart key device;

In step B4, further includes updating the authenticating times after forming the response data of the authentication requesting command according to the authenticating times and the second signing result.

The technical effect of the present invention is as the following: the key information used for authenticating identity is stored in the smart key device, and the smart key device provided by the present invention interacts with a server in online transaction process, which is safer than storing the key information interacted with the server in a client side. In addition, by setting operation of authenticating by pressing key by the user on the smart key device, the security of the online transaction is enhanced.

DESCRIPTION OF EMBODIMENTS

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those of ordinary skill in the art without any creative work belong to the scope of the disclosure.

Embodiment 1

The present invention provides a working method of a smart key device, which includes a process flow of processing a received register requesting command by the smart key device and a process of processing a received authentication requesting command by the smart key device.

Figure 1A:
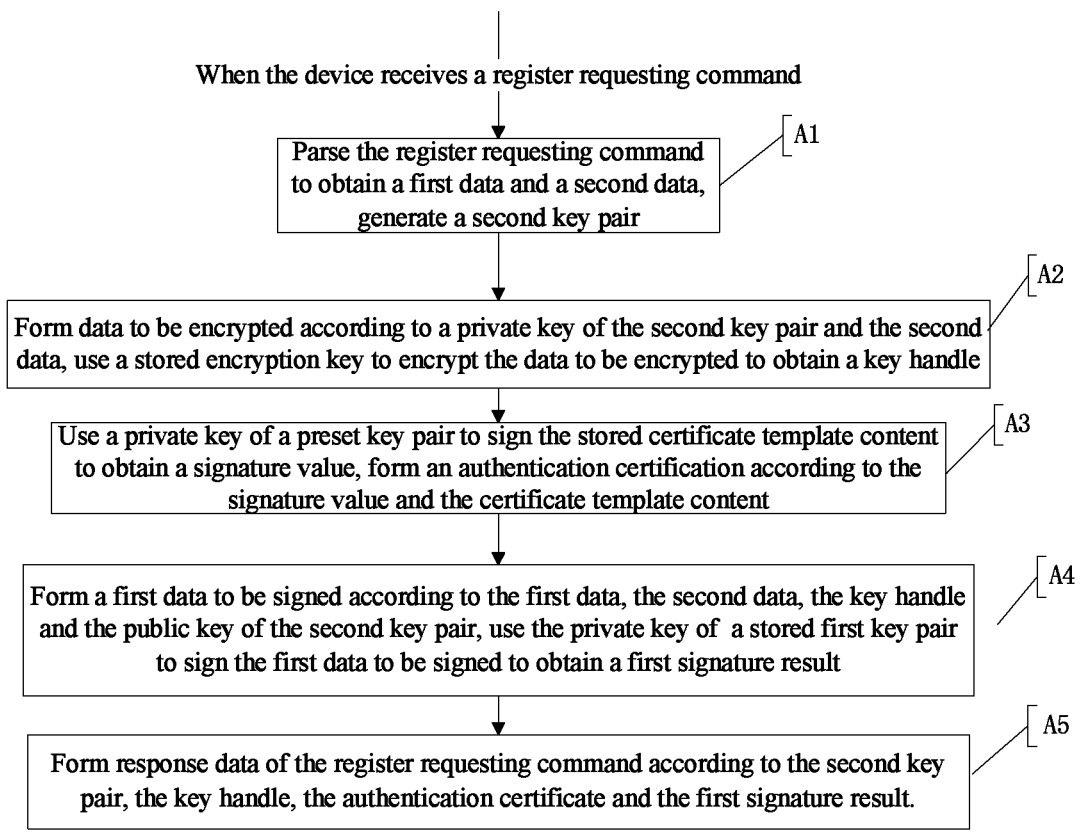
FIG. 1A is a flow diagram for processing a register requesting command by a smart key device according to embodiment 1 of the present invention.

As shown in FIG. 1A, when the device receives the register requesting command, executes following steps:

Step A1, parsing the register requesting command to obtain a first data and a second data, and generating a second key pair;

For example, the register requesting command is made up of data of 64 bytes; step A1 specifically is: parsing the register requesting command, obtaining the first 32 bytes of data as a first data, obtaining the last 32 bytes of data as a second data.

Preferably, the present step further includes forming certificate template content according to a public key of the second key pair and a certificate sequence number, which is generated when the device is powered up.

Step A2, forming a data to be encrypted according to a private key of the second key pair and the second data, and using a stored encryption key to encrypt the data to be encrypted to obtain a key handle;

Further, the present step may use a random number generated by the device, a private key of the second key pair and the second data to form the data to be encrypted.

Step A3, using a private key of a preset key pair to sign the stored certificate template content to obtain a signing value, and forming an authentication certificate according to the signing value and the certificate template content;

Preferably, the certificate template content includes the public key of the second key pair and the certificate sequence number.

Step A4, forming a first data to be signed according to the first data, the second data, the key handle and the public key of the second key pair, and using a private key of a stored first key pair to sign the first data to be signed to obtain a first signing result;

Preferably, the first key pair maybe pre-stored in the device or the first key pair maybe generated when the device is powered up for the first time and stored in the device. For example, the first key pair adapts an ECC key pair.

Step A5, forming response data of the register requesting command according to the second key pair, the key handle, the authentication certificate and the first signing result.

Figure 1B:
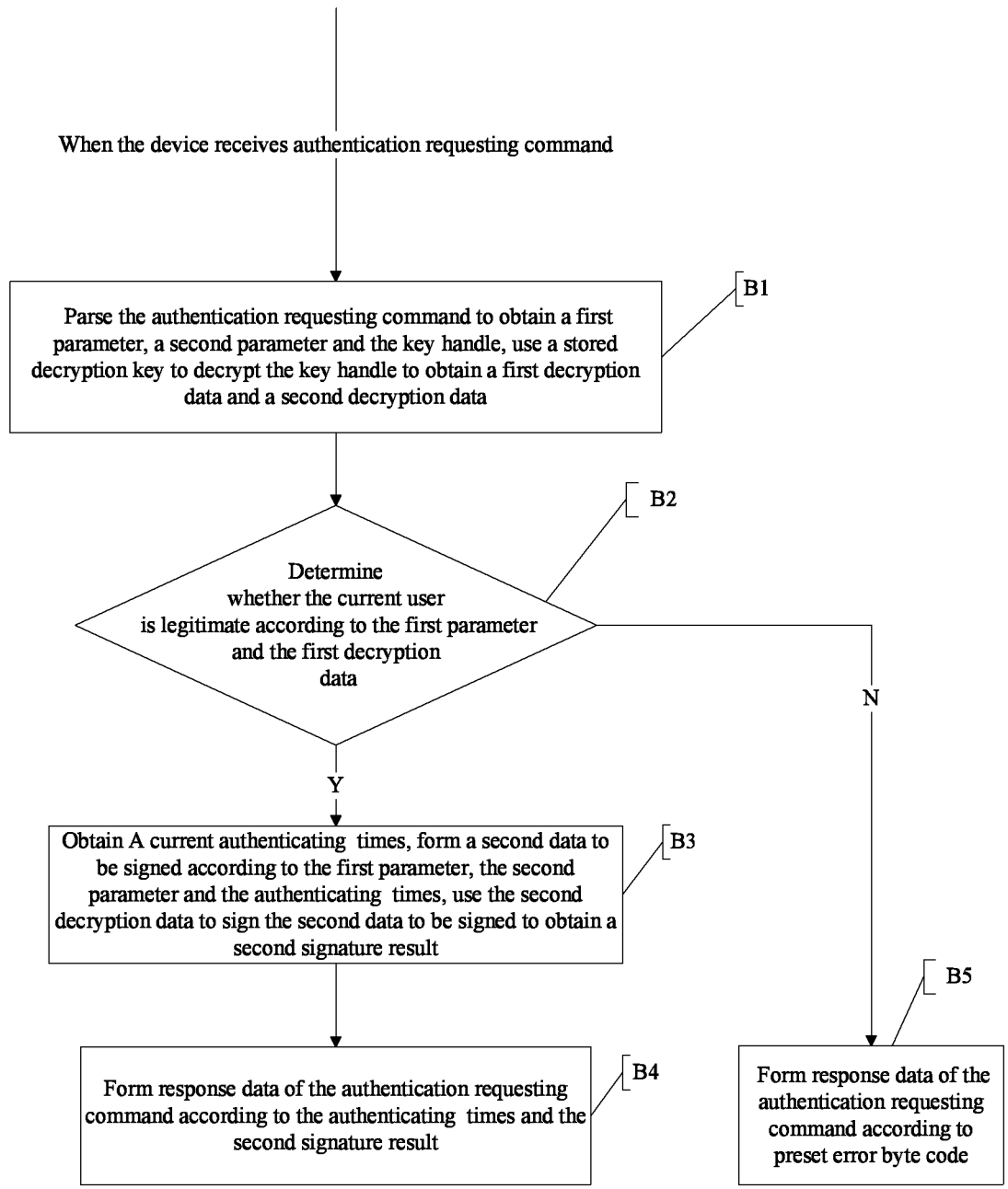
FIG. 1B is a flow diagram for processing an authenticating command by the smart key according to embodiment 1 of the present invention.

As shown in FIG. 1B, when the device receives an authentication requesting command, executes following steps:

Step B1, parsing the authentication requesting command to obtain a first parameter, a second parameter and the key handle, and using a stored decryption key to decrypt the key handle to obtain a first decryption data and a second decryption data;

For example, the data formed by the authentication requesting command includes a first parameter (32 bytes), a second parameter (32 bytes), a key handle length value (1 byte) and a key handle.

Specifically, the present step is parsing the authentication requesting command, taking the first 32 bytes of the data as the first parameter, taking the data from the 33rd byte to the 64th byte as the second parameter, determining length of the key handle according to the 65th byte, and taking the data after the 65th byte with corresponding length as the key handle.

Step B2, determining whether the current user is legitimate according to the first parameter and the first decryption data, if yes, executing step B3, otherwise, executing step B5;

Step B3, obtaining a current authenticating times, forming a second data to be signed according to the first parameter, the second parameter and the authenticating times, and using the second decryption data to sign the second data to be signed to obtain a second signing result;

Step B4, forming a response data of the authentication requesting command according to the authenticating times and the second signing result.

Step B5, forming the response data of the authentication requesting command according to preset error byte.

Preferably, in the present embodiment, the encryption key and the decryption key may adapt AES symmetrical key.

Embodiment 2

Figure 2:
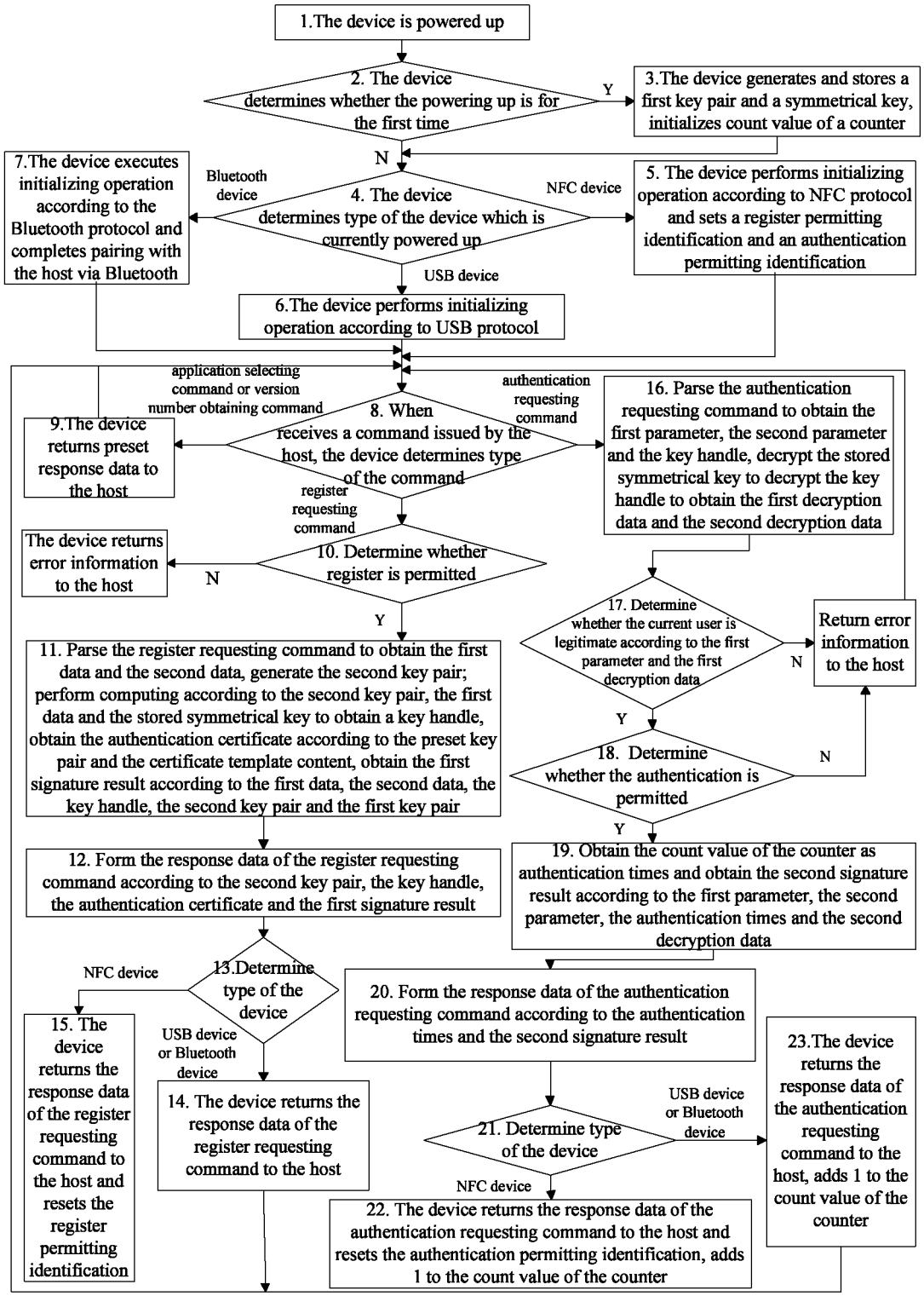
FIG. 2 is a flow diagram for a working method of the smart key device according to embodiment 2 of the present invention.

The embodiment of the present invention provides a working method of the smart key device. As shown in FIG. 2, the method includes following contents:

Step 1, the device is powered up;

Step 2, the device determines whether the powering up is for the first time, if yes, executes step 3, otherwise, executes step 4;

Preferably, the device may determine whether the device is powered up for the first time according to a power-up identification, if the power-up identification is not set, the device is powered up for the first time and set the power-up identification, and execute step 3, otherwise, execute step 4.

Further, if the device is powered up for the first time, the step further includes generating a certificate sequence number and storing the certificate sequence number.

Step 3, the device generates and stores a first key pair and a symmetrical key, initializes count value of a counter, then execute step 4;

Preferably, the generated symmetrical key is AES key, initializing the count value of the counter is specifically setting the count value of the counter as 0.

Step 4, the device determines type of the device which is currently powered up, if the device is a NFC device, executes step 5, if the device is an USB device, executes step 6, if the device is a Bluetooth device, execute step 7;

Specifically, the device determines type of the device which is currently powered up, if the type is the NFC device, sets a first device identification and executes step 5; if the type is the USB device, sets a second device identification and executes step 6, if the type is the Bluetooth device, sets a third device identification and executes step 7. Further, when the device is powered off, the first device identification, the second device identification and the third device identification can be reset.

Or, the device determines the type of the device which is powered up currently, if the type is the NFC device, sets the device identification as a first value, if the type is the USB device, sets the device identification to be a second value, if the type is the Bluetooth device, sets the device identification to be a third value, further, the device identifications is cleared to zero when the device is powered off.

Step 5, the device performs initializing operation according to a NFC protocol and sets a register permitting identification and an authentication permitting identification, then executes step 8;

Step 6, the device performs initializing operation according to an USB protocol, then executes step 8;

Step 7, the device executes initializing operation according to the a Bluetooth protocol and completes pairing with the host via Bluetooth, then executes step 8;

Step 8, when the device receives a command issued by the host, the device determines type of the command, if the type is application selecting command or version number obtaining command, executes step 9; if the type is the register requesting command, executes step 10; if the type is the authentication requesting command, executes step 16;

Specifically, when the device receives a command issued by the host, the device determines type of the command according to the second byte of the command, if the second byte is a first value, the type is register requesting command, if the second byte is a second value, the type is authentication requesting command, if the second byte is a third value, the type is version number obtaining command, if the second byte is a fourth value, the type is application selecting command; preferably, the first value is 01, the second value is 02, the third value is 03, the fourth value is A4.

For example, the application selecting command specifically is 0x00A4040008A0000006472F0001.

Step 9, the device returns a preset response data to the host, then goes back to step 8;

Specifically, the device takes a fixed data as the preset response data to the host.

For example, the preset response data returned to the host by the device is 0x5532465F56329000, the response data corresponds to character string U2F_V2, which represents that the device supports U2F_V2.

Step 10, determines whether a register is permitted, if yes, executes step 11, otherwise, the device returns error information to the host and goes back to step 8;

Step 11, parses the register requesting command to obtain the first data and the second data, generates the second key pair; perform computing according to the second key pair, the first data and the stored symmetrical key to obtain a key handle, obtains the authentication certificate according to the preset key pair and the certificate template content, and obtains the first signing result according to the first data, the second data, the key handle, the second key pair and the first key pair;

Specifically, the generated second key pair specifically is generating an ECC key and taking the ECC key as the second key pair; preferably, after generating the second key pair, the method further includes forming the certificate template content according to the certificate sequence number and the public key of the second key pair and storing the authenticate template content.

The computing according to the second key pair, the first data and the stored symmetrical key to obtain the key handle specifically is, forming a data to be encrypted according to a private key of the second key pair and the first data, and using the stored symmetrical key to encrypt the data to be encrypted to obtain the key handle; preferably, may further include filling the random number generated by the device in the data to be encrypted.

The obtaining the authentication certificate according to a preset key pair and the certificate template content specifically is, using the private key of the preset key pair to sign the stored certificated template content to obtain the signing value, and forming the authentication certificate according to the signing value and the certificate template content; preferably, the authentication certificate is X.509 certificate, of which the format is as the following:

| [Certificate ::= SEQUENCE { | |
|---|---|
| tbsCertificate TBSCertificate, | // certificate template content |
| signatureAlgorithm AlgorithmIdentifier, | //signature algorithm identification |
| signature BIT STRING | //signing value |
| } | |

Where, the certificate template content includes the certificate sequence number and the public key of the second key pair.

The obtaining a first signing result according to the first data, the second data, the key handle and the second key pair and the first key pair specifically is, forming the first data to be signed according to the first data, the second data, the key handle and the public key of the second key pair, and using a private key of the stored first key pair to sign the first data to be signed to obtain the first signing result.

The forming the first data to be signed according to the first data, the second data, the key handle and the public key of the second key pair specifically is, concatenating 0x00, the first data (32 bytes), the second data (32 bytes), the key handle and the public key of the second key pair orderly to form the first data to be signed.

Step 12, forms the response data of the register requesting command according to the second key pair, the key handle, the authentication certificate and the first signing result;

Specifically, the response data of the register requesting command is formed by using the second key pair, the key handle, the authentication certificate and the first signing result according to a first preset format.

For example, the first preset format is: 0x05+the public key of the second key pair (65 bytes)+length of the key handle (1 byte)+key handle+authentication certificate+the first signing result.

Step 13, determines a type of the device, if the device is the USB device or the Bluetooth device, executes step 14; if the device is the NFC device, executes step 15;

Specifically, the type of the device is determined according to a device identification which is currently set, if a first device identification is set, the type of the device is the NFC device; if a second device identification is set, the type of the device is the USB device; if a third device identification is set, the type of the device is the Bluetooth device.

Step 14, the device returns the response data of the register requesting command to the host, goes back to step 8;

Step 15, the device returns the response data of the register requesting command to the host and resets the register permitting identification, goes back to step 8;

Step 16, parses the authentication requesting command to obtain the first parameter, the second parameter and the key handle, decrypts the stored symmetrical key to decrypt the key handle to obtain the first decryption data and the second decryption data;

Step 17, determines whether the current user is legitimate according to the first parameter and the first decryption data, if yes, executes step 18; otherwise, returns error information to the host and goes back to step 8;

Specifically, the determining whether the current user is legitimate according to the first parameter and the first decryption data is, determining whether the first decryption data and the first parameter are identical, if yes, the current user is legitimate, otherwise, the current user is not legitimate.

Step 18, determines whether the authentication is permitted, if yes, executes step 19, otherwise, the device returns error information to the host and goes back to step 8;

Step 19, obtains the count value of the counter as authenticating times and obtains the second signing result according to the first parameter, the second parameter, the authenticating times and the second decryption data;

Specifically, the obtaining the second signing result according to the first parameter, the second parameter, the authenticating times and the second decryption data is, forming the second data to be signed according to the first parameter, the second parameter and the authenticating times, use the second decryption data to sign the second data to be signed to obtain the second signing result.

Step 20, forms the response data of the authentication requesting command according to the authenticating times and the second signing result;

Specifically, the response data of the authentication requesting command is formed by using the authenticating times and the second signing result according to the second preset format.

For example, the second preset format is: 0x01+authenticating times (4 bytes)+second signing result.

Step 21, determines the type of the device, if the type is the NFC device, executes step 22, if the type of the device is the USB device or the Bluetooth device, executes step 23;

Specifically, the determining the type of the device according to the device identification which is currently set, if the first device identification is set, the type of the device is NFC device; if the second device identification is set, the type of the device is USB device; if the third device identification is set, the type of the device is Bluetooth device. Further, when the device is powered off, the device identification is reset.

Step 22, the device returns the response data of the authentication requesting command to the host and resets the authentication permitting identification, adds 1 to the count value of the counter, then goes back to step 8;

The present step may further be that the device resets the authentication permitting identification, adds 1 to the count value of the counter and then returns the response data of the authentication requesting command to the host.

Step 23, the device returns the response data of the authentication requesting command to the host, adds 1 to the count value of the counter, then goes back to step 8.

Embodiment 3

Figure 3:
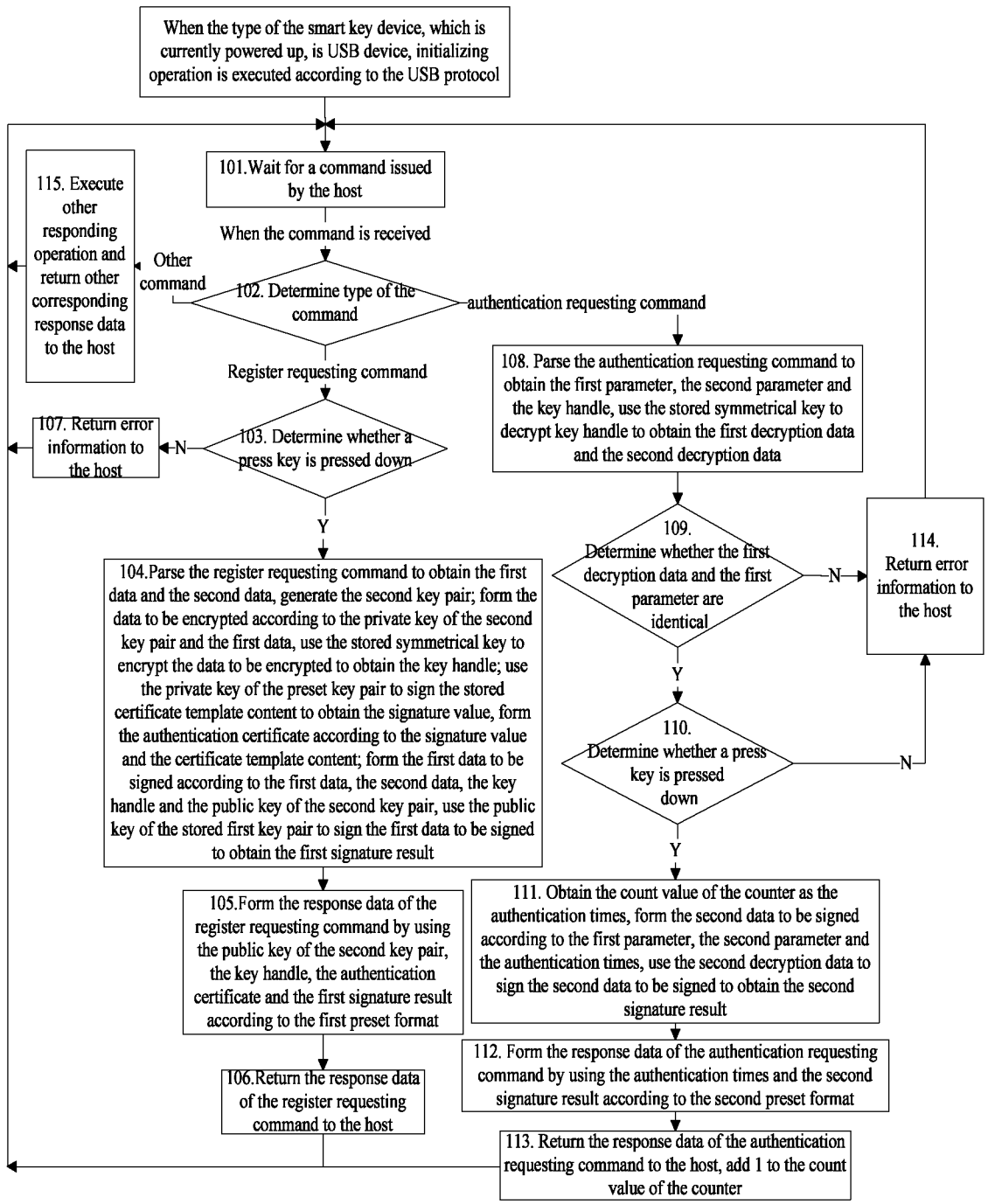
FIG. 3 is a flow diagram for a working method of a USB device or a Bluetooth device according to embodiment 3 of the present invention.

The present invention provides a working method of the smart key device. As shown in FIG. 3, when the type of the smart key device, which is currently powered up, is the USB device, initializing operation is executed according to the USB protocol and executes step 101, or when the type of the smart key device, which is currently powered up, is the Bluetooth device, initializing operation is executed according to the Bluetooth protocol and pairing the host via the Bluetooth is completed, then executes step 101.

specifically as follows,

Step 101, waits for a command issued by the host;

When the command is received, executes step 102;

Step 102, determines the type of the command, if the type is the register requesting command, executes step 103, if the type is the authentication requesting command, executes step 108, if the type is other command, executes step 115;

Step 103, determines whether a press key is pressed down, if yes, executes step 104, otherwise, executes step 107;

Step 104, parses the register requesting command to obtain the first data and the second data, generates the second key pair; forms the data to be encrypted according to the private key of the second key pair and the first data, and uses the stored symmetrical key to encrypt the data to be encrypted to obtain the key handle; uses the private key of the preset key pair to sign the stored certificate template content to obtain the signing value, and forms the authentication certificate according to the signing value and the certificate template content; forms the first data to be signed according to the first data, the second data, the key handle and the public key of the second key pair, and uses the public key of the stored first key pair to sign the first data to be signed to obtain the first signing result;

Step 105, forms the response data of the register requesting command by using the public key of the second key pair, the key handle, the authentication certificate and the first signing result according to the first preset format;

Step 106, returns the response data of the register requesting command to the host and goes back to step 101;

Step 107, returns error information to the host, goes back to step 101.

Step 108, parses the authentication requesting command to obtain the first parameter, the second parameter and the key handle, use the stored symmetrical key to decrypt key handle to obtain the first decryption data and the second decryption data;

Step 109, determines whether the first decryption data and the first parameter are identical, if yes, execute step 110, otherwise, executes step 114;

Step 110, determines whether a press key is pressed down, if yes, executes step 111, otherwise, executes step 114;

Step 111, obtains the count value of the counter as the authenticating times, forms the second data to be signed according to the first parameter, the second parameter and the authenticating times, and uses the second decryption data to sign the second data to be signed to obtain the second signing result;

Step 112, forms the response data of the authentication requesting command by using the authenticating times and the second signing result according to the second preset format;

Step 113, returns the response data of the authentication requesting command to the host, add 1 to the count value of the counter, goes back to step 101;

Step 114, returns error information to the host, goes back to step 101.

Step 115, executes other responding operation and returns other corresponding response data to the host, goes back to step 101.

Figure 4:
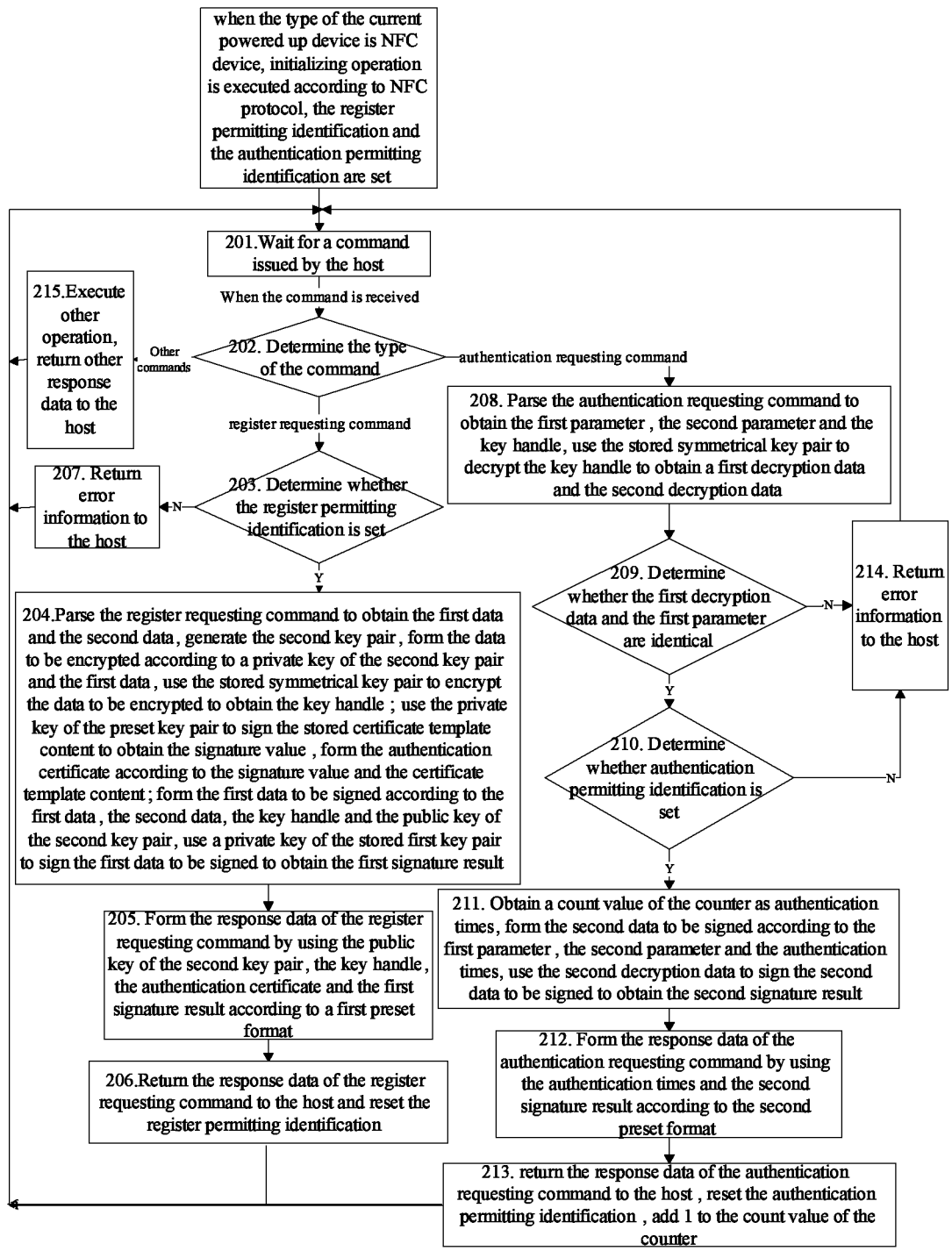
FIG. 4 is a flow diagram of a working method of a NFC device according to embodiment 3 of the present invention.

As shown in FIG. 4, when the type of the currently powered up device is the NFC device, initializing operation is executed according to NFC protocol, the register permitting identification and the authentication permitting identification are set, then step 201 is executed as the following:

Step 201, waits for a command issued by the host;

When the command is received, step 202 is executed;

Step 202, determines the type of the command, if the type is the register requesting command, executes step 203, if the type is the authentication requesting command, execute step 208, if the type is another command, executes step 215;

Step 203, determines whether the register permitting identification is set, if yes, executes step 204, otherwise executes step 207;

Step 204, parses the register requesting command to obtain the first data and the second data, generates the second key pair, forms the data to be encrypted according to a private key of the second key pair and the first data, and uses the stored symmetrical key pair to encrypt the data to be encrypted to obtain the key handle; uses the private key of the preset key pair to sign the stored certificate template content to obtain the signing value, and forms the authentication certificate according to the signing value and the certificate template content; forms the first data to be signed according to the first data, the second data, the key handle and the public key of the second key pair, and uses a private key of the stored first key pair to sign the first data to be signed to obtain the first signing result;

Step 205, forms the response data of the register requesting command by using the public key of the second key pair, the key handle, the authentication certificate and the first signing result according to a first preset format;

Step 206, returns the response data of the register requesting command to the host and resets the register permitting identification, goes back to step 201;

Step 207, returns error information to the host, goes back to step 201.

Step 208, parses the authentication requesting command to obtain the first parameter, the second parameter and the key handle, and uses the stored symmetrical key pair to decrypt the key handle to obtain a first decryption data and the second decryption data;

Step 209, determines whether the first decryption data and the first parameter are identical, if yes, executes step 210, otherwise, executes step 214;

Step 210, determines whether the authentication permitting identification is set, if yes, executes step 211, otherwise, executes step 214;

Step 211, obtains a count value of the counter as authenticating times, forms the second data to be signed according to the first parameter, the second parameter and the authenticating times, and uses the second decryption data to sign the second data to be signed to obtain the second signing result;

Step 212, forms the response data of the authentication requesting command by using the authenticating times and the second signing result according to the second preset format;

Step 213, returns the response data of the authentication requesting command to the host, resets the authentication permitting identification, adds 1 to the count value of the counter, and goes back to step 201;

Step 214, returns error information to the host, and goes back to step 201.

Step 215, executes other corresponding operations, returns other response data to the host, and goes back to step 201.

Embodiment 4

Figure 5:
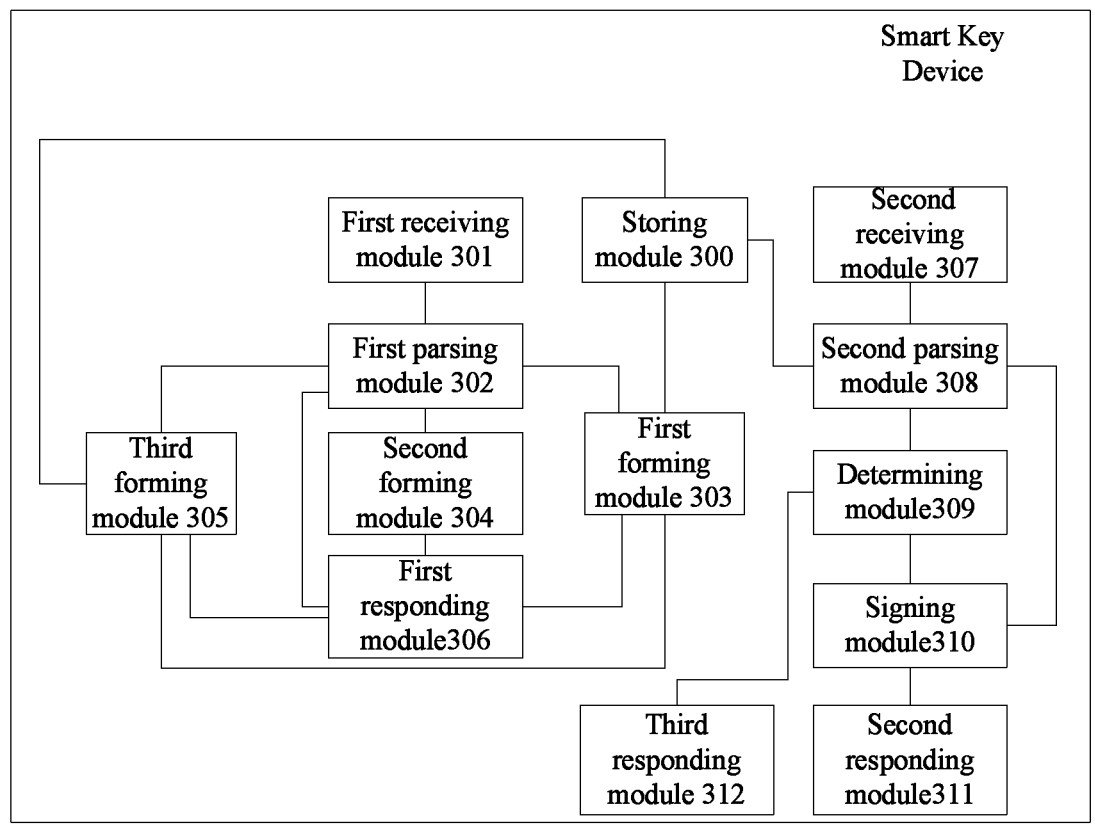
FIG. 5 is a structural diagram of the smart key device according to embodiment 4 of the present invention.

As shown in FIG. 5, the present embodiment provides a smart key device, includes: a storing module 300, a first receiving module 301, a first parsing module 302, a first forming module 303, a second forming module 304, a third forming module 305, a first responding module 306, a second receiving module 307, a second parsing module 308, a determining module 309, a signing module 310, a second responding module 311 and a third responding module 312;

the storing module 300, is configured to store a first key pair, an encryption key, and a decryption key;

the first receiving module 301, is configured to receive a register requesting command issued by a host and trigger the first parsing module 302;

the first parsing module 302, is configured to parse the register requesting command received by the first receiving module 301 to obtain a first data and a second data, generate a second key pair and trigger the first forming module 303, the second forming module 304 and the third forming module 305;

the first forming module 303, is configured to form the data to be encrypted according to the second data obtained by parsing by the first parsing module 302 and the second key pair generated by the first parsing module 302, and use the encryption key stored in the storing module 300 to encrypt the data to be encrypted to obtain a key handle;

the second forming module 304, is configured to use a private key of the preset key pair to sign a preset certificate template content to obtain a signing value, and form the authentication certificate according to the signing value and the preset certificate template content; preferably, the preset certificate template content includes a certificate sequence number and a public key of the second key pair.

The third forming module 305, is configured to form a first data to be signed according to the first data and the second data obtained by parsing by the first parsing module 302, the key handle obtained by the first forming module 303 and a public key of the second key pair generated by the first parsing module 302, use a private key of the first key pair stored in the storing module 300 to sign the first data to be signed to obtain a first signing result;

the first responding module 306, is configured to form response data of the register requesting command according to the second key pair generated by the first parsing module 302, the key handle obtained by the first forming module 303, the authentication certificate obtained by the second forming module 304 and the first signing result obtained by the third forming module 305, and return the response data to the host;

the second receiving module 307, is configured to receive an authentication requesting command issued by the host and trigger the second parsing module 308;

the second parsing module 308, is configured to parse the authentication requesting command received by the second receiving module 307 to obtain a first parameter, a second parameter and the key handle, use the decryption key stored in the storing module 300 to decrypt the key handle to obtain a first decryption data and a second decryption data;

the determining module 309, is configured to determine whether a current user is legitimate according to the first parameter obtained by parsing by the second parsing module 308 and the first decryption data obtained by decrypting by the second parsing module, if yes, trigger the signing module 310, otherwise trigger the third responding module 312;

Preferably in the present embodiment, the determining module 309, is specifically configured to determine whether the first decryption data obtained by decrypting by the second parsing module 308 is identical to the first parameter obtained by the second parsing module 308, if yes, determine that the current user is legitimate, trigger the signing module 310, if no, determine that the current user is not legitimate, trigger the third responding module 312.

The signing module 310, is configured to obtain the current authenticating times, form a second data to be signed according to the authenticating times, the first parameter and the second parameter obtained by parsing by the second parsing module 308, use the second decryption data obtained by decrypting by the second parsing module 308 to sign the second data to be signed to obtain a second signing result, and trigger the second responding module 311;

the second responding module 311, is configured to form the response data of the authentication requesting command according to the authenticating times and the second signing result obtained by the signing module 310 and return the response data to the host;

the third responding module 312 is configured to form the response data of the authentication requesting command according to a preset error byte-code and return the response data to the host.

Preferably, the smart key device further includes a generating module;

the generating module is configured to, when the smart key device is powered up for the first time, generate the first key pair, the encryption key and the decryption key and store the first key pair, the encryption key and the decryption key in the storing module 300; the generating module is further configured to set an initial value of the authenticating times of an initial powering up;

or the generating module is configured to, when the smart key device is powered up for the first time, generate the encryption key and the decryption key and store the encryption key and the decryption key in the storing module 300; the generating module is further configured to set an initial value of the authenticating times of an initial powering up;

correspondingly, the second responding module 311 is further configured to update the authenticating times.

Preferably, the generating module is further configured to generate a certificate sequence number when the smart key device is powered up for the first time. Correspondingly, the second forming module 304 is further configured to form the preset certificate template content according to the certificate sequence number and the public key of the second key pair generated by the first parsing module 302.

Further, the smart key device provided by the present embodiment further includes a power-up initializing module;

the power-up initializing module is configured to power up the device and execute initializing operation and complete Bluetooth pairing operation;

Correspondingly, the determining module 309 is further configured to, after the smart key device is powered up, determine type of the device which is powered up; if the device is NFC device, identify the type of the device as NFC device, trigger the power-up initializing module to perform initializing operation according to NFC protocol, set the register permitting identification and authentication permitting identification; if the device is USB device, identify the type of the device as USB device, trigger the power-up initializing module to perform initializing operation according to USB protocol; if the device is Bluetooth device, identify the type of the device as identification device as Bluetooth device, trigger the power-up initializing module to perform initializing operation according to Bluetooth protocol and complete pairing via Bluetooth with the host.

Correspondingly, the first parsing module 302 is configured to determine whether register is permitted, if yes, parse the register requesting command received by the first receiving module 301 to obtain the first data and the second data, generate the second key pair; otherwise, return error information to the host.

That the first parsing module 302 is configured to determine whether register is permitted specifically includes that the first parsing module 302 is configured to determine whether a press key is pressed down, if yes, determine that register is permitted; otherwise, determine that register is not permitted.

Or, that the first parsing module 302 is configured to determine whether register is permitted specifically includes that the first parsing module 302 is configured to determine whether register permitting identification is set, if yes, determine that register is permitted; otherwise, determine that register is not permitted.

Correspondingly, the second parsing module 308 is configured to determine whether authentication is permitted, if yes, parse the authentication requesting command received by the second receiving module 307 to obtain the first parameter, the second parameter and the key handle, use the second decryption data obtained by the second parsing module 308 to sign the second data to be signed to obtain the signing result and trigger the second responding module 311; otherwise, trigger the third responding module 312.

That the second parsing module 308 is configured to determine whether authentication is permitted specifically includes that the second parsing module 308 determines whether a press key is pressed down, if yes, determine that authentication is permitted; otherwise, determine that authentication is not permitted.

or that the second parsing module 308 is configured to determine whether authentication is permitted specifically includes that the second parsing module 308 is configured to determine whether register permitting identification is set, if yes, determine that authentication is permitted; otherwise, determine that authentication is not permitted.

Further, the smart key device provided by the present embodiment further includes a third receiving module; the third receiving module is configured to receive an application selecting command or a version number obtaining command issued by the host, and return preset response data to the host.

Further, the smart key device provided by the present embodiment can further include a random number generating module;

the random number generating module is configured to generate a random number;

correspondingly, the second forming module 304 is specifically configured to form the data to be encrypted according to the second data obtained by parsing by the first parsing module 302, the private key of the second key pair generated by the first parsing module 302 and the random number generated by the random number generating module, and use the encryption key stored by the storing module 300 to encrypt the data to be encrypted to obtain the key handle.

The described embodiments are only preferred embodiments of the application and the embodiments are not intended to limit the application. Any alteration or change easily obtained by those skilled in the art based on the application should fall in the scope of protection of the application.

What is claimed is:

1. A method executed by a smart key device, comprising:
   receiving a register requesting command issued by a host
   parsing the register requesting command to obtain a first data and a second data, and generating a second key pair;
   forming a data to be encrypted according to a private key of the second key pair and the second data, using a stored encryption key to encrypt the data to be encrypted to obtain a key handle, using a private key of a preset key pair to sign a stored certification template content to obtain a signing value, and forming an authentication certificate according to the signing value and the certificate template content;

forming a first data to be signed according to the first data, the second data, the key handle and a public key of the second key pair, and using a private key of a stored first key pair to sign the first data to be signed to obtain a first signing result;

and forming a response data of the register requesting command according to the second key pair, the key handle, the authentication certificate and the first signing result, and returning the response data to the host;

the method further comprises: when receiving, by the smart key device, an authentication requesting command issued from the host, executing: parsing the authentication requesting command to obtain a first parameter, a second parameter and a key handle, using a stored decrypting key to decrypt the key handle to obtain a first decryption data and a second decryption data;

determining whether a current user is legitimate according to the first parameter and the first decryption data;

in response to determining that the current user is legitimate, obtaining a current authenticating times, forming a second data to be signed according to the first parameter, the second parameter and the authenticating times, and using the second decryption data to sign the second data to be signed to obtain a second signing result;

and forming a response data of the authentication requesting command according to the authenticating times and the second signing result, and returning the response data to the host; in response to determining that the current user is not legitimate, forming the response data of the authentication requesting command according to a preset error byte-code, and returning the response data to the host.

2. The method according to claim 1, wherein the determining whether the current user is legitimate according to the first parameter and the first decryption data specifically comprises: determining whether the first decryption data and the first parameter are identical, if the first decryption data and the first parameter are identical, determining that the current user is legitimate, otherwise, determining that the current user is not legitimate.

3. The method according to claim 1, further comprising: when the smart key device is powered up for the first time, generating and storing the first key pair, the encryption key and the decryption key, and setting an initial value of the authenticating times;

or further comprising: when the smart key device is powered up for the first time, generating and storing the encryption key and the decryption key, and setting an initial value of the authenticating times; and the first key pair is pre-stored in the smart key device;

after the forming the response data of the authentication requesting command according to the authenticating times and the second signing result, further comprising updating the authenticating times.

4. The method of according to claim 1, further comprising: after the smart key device is powered up, executing:
determining a type of the device which is currently powered up;
if being a NFC device, identifying the device type as the NFC device, executing initializing operation according to a NFC protocol, and setting a permitting register identification and a permitting authentication identification, then waiting for receiving a command issued by the host;

if being a USB device, identifying the device type as the USB device, executing initializing operation according to a USB protocol, then waiting for a command issued by the host;

if being a Bluetooth device, identifying the device type as the Bluetooth device, executing initializing operation according to a Bluetooth protocol, then waiting for a command issued by the host.

5. The method according to claim 4, wherein before the parsing the register requesting command to obtain a first data and a second data, further comprising: determining whether a register is permitted, if the register is permitted, executing the step of parsing the register requesting command to obtain the first data and the second data and generating the second key pair, otherwise, returning error information to the host.

6. The method according to claim 5, wherein if a currently identified device type is the USB device or the Bluetooth device, the determining whether the register is permitted specifically is determining whether a press key is pressed down, if yes, the register is permitted, otherwise, the register is not permitted;

if the currently identified device type is the NFC device, the determining whether the register is permitted specifically is determining whether the permitting register identification is set, if yes, the register is permitted, otherwise, the register is not permitted.

7. The method according to claim 4, wherein, before the obtaining a current authenticating times, forming a second data to be signed according to the first parameter, the second parameter and the authenticating times, and using the second decryption data to sign the second data to be signed to obtain a second signing result, further comprising: determining whether an authentication is permitted;

if the authentication is permitted, executing the step of obtaining the current authenticating times, forming the second data to be signed according to the first parameter, the second parameter and the authenticating times, and using the second decryption data to sign the second data to be signed to obtain the second signing result;

otherwise, returning error information to the host.

8. The method according to claim 7, wherein if the current identified device type is the USB device or the Bluetooth device, the determining whether authentication is permitted specifically is determining whether a press key is pressed down, if yes, the authentication is permitted, otherwise, the authentication is not permitted;

if the current identified device type is the NFC device, the determining whether the authentication permitted specifically is determining whether an authentication permitting identification is set, if yes, the authentication is permitted, otherwise, the authentication is not permitted.

9. The method according to claim 1, further comprising: when the smart key device receives an application selecting command or a version number obtaining command, returning a preset response data to the host.

10. The method according to claim 1, wherein, the forming the data to be encrypted according to the private key of the second key pair and the second data specifically is forming the data to be encrypted according to the private key of the second key pair, the second data and a random number generated by the smart key device.

11. A smart key device, comprising:
a processor; and
a non-transitory computer readable storage medium, wherein the non-transitory computer readable storage medium stores computer program codes that, when executed by the processor, cause the processor to execute steps comprising:

storing a first key pair, an encryption key, and a decryption key;

receiving a register requesting command issued by a host;

parsing the register requesting command to obtain a first data and a second data, and generating a second key pair;

forming a data to be encrypted according to the second data obtained by parsing and a private key of the second key pair, and using an encryption key stored to encrypt the data to be encrypted to obtain a key handle;

using a private key of a preset key pair to sign a preset certificate template content to obtain a signing value, and forming an authentication certificate according to the signing value and the preset certification template content;

forming a first data to be signed according to the first data and the second data obtained by parsing, the key handle and a public key of the second key pair, and using a private key of the first key pair stored to sign the first data to be signed to obtain a first signing result; and forming a response data of the register requesting command according to the second key pair, the key handle the authentication certificate and the first signing result, and returning the response data to the host;

the processor is further caused to execute steps comprising:

receiving an authentication requesting command issued by the host;

parsing the authentication requesting command to obtain a first parameter, a second parameter and a key handle, and using the decryption key stored to decrypt the key handle to obtain a first decryption data and a second decryption data;

determining whether a current user is legitimate according to the first parameter obtained by parsing and the first decryption data obtained by decrypting;

in response to determining that the current user is legitimate, obtaining a current authenticating times, forming a second data to be signed according to the authenticating times, the first parameter and the second parameter which are obtained by parsing, and using the second decryption data obtained by decrypting to sign the second data to be signed to obtain a second signing result; and forming a response data of the authentication requesting command according to the authenticating times and the second signing result and returning the response data to the host;

in response to determining that the current user is not legitimate, forming the response data of the authentication requesting command according to preset bytecode and returning the response data to the host.

12. The device according to claim 11, wherein, the processor is caused to execute steps comprising: determining whether the first decryption data and the first parameter are identical, if the first decryption data and the first parameter are identical, determining that the current user is legitimate, otherwise, determining that the current user is not legitimate.

13. The device according to claim 11, wherein, the processor is further caused to execute steps comprising:

generating the first key pair, the encryption key and the decryption key and storing the first key pair, the encryption key and the decryption key when the smart key device is powered up for the first time, and setting an initial value of the authenticating times when the smart key device is powered up for the first time;

or, when the smart key device is powered up for the first time, generating the encryption key and the decryption key and storing the encryption key and the decryption key, and setting the initial value of the authenticating times when the device is powered for the first time;

updating the authenticating times.

14. The device according to claim 11, wherein the processor is further caused to execute steps comprising:

powering up the device and executing an initializing operation and completing a Bluetooth pairing operation;

determining a type of a device which is powered up currently after the smart key device is powered up, if being a NFC device, identifying the device type as the NFC device and executing the initializing operation according to a NFC protocol, and setting a register permitting identification and an authentication permitting identification, if being a USB device, identifying the device type as the USB device and executing the initializing operation according to a USB protocol, if being a Bluetooth device, identifying the device type as the Bluetooth device, executing the initializing operation according to a Bluetooth protocol and completing a Bluetooth pairing with the host.

15. The device according to claim 14, wherein, the processor is caused to execute steps comprising: determining whether a register is permitted, if yes, parsing the register requesting command to obtain the first data and the second data, and generating the second key pair, otherwise, returning error information to the host.

16. The device according to claim 15, wherein, the processor is caused to execute steps comprising: determining whether a press key is pressed down, if a press key is pressed down, parsing the register requesting command to obtain the first data and the second data, and generating a second key pair, otherwise, returning error information to the host;

or, the processor is caused to execute steps comprising: determining whether the register permitting identification is set, if yes, analyzing the register requesting command to obtain the first data and the second data, and generating the second key pair, otherwise, returning error information to the host.

17. The device according to claim 14, wherein, the processor is caused to execute steps comprising: determining whether the authentication is permitted, if yes, parsing the authentication requesting command to obtain the first parameter, the second parameter and the key handle, using the second decryption date obtained by decrypting to sign the second data to be signed to obtain the second signing result, forming the response data of the authentication requesting command according to the authenticating times and the second signing result and returning the response data to the host otherwise, forming the response data of the authentication requesting command according to preset byte-code and returning the response data to the host.

18. The device according to claim 17, wherein, the processor is caused to execute steps comprising: determining whether a press key is pressed down, if the press key is pressed down, parsing the authentication requesting command to obtain the first parameter, the second parameter and the key handle, using the second decryption data obtained by the decrypting to sign the second data to be signed to obtain the second signing result, forming the response data of the authentication requesting command according to the authenticating times and the second signing result and returning the response data to the host; otherwise, forming the response data of the authentication requesting command according to preset byte-code and returning the response data to the host;

or, the processor is caused to execute steps comprising: determining whether the register permitting identification is set, if yes, parsing the register requesting command to obtain the first data and the second data, and generating the second key pair, otherwise, forming the response data of the authentication requesting command according to preset byte-code and returning the response data to the host.

19. The device according to claim 11, wherein, the processor is further caused to execute steps comprising: receiving an application selecting command or a version number obtaining command, which are issued by a host, and returning a preset response data to the host.

20. The device according to claim 11, wherein, the processor is further caused to execute steps comprising: generating a random number;

forming the data to be encrypted according to the second data, the private key of the second key pair and the random number, and using the encryption key stored to encrypt the data to be encrypted to obtain the key handle.

* * * * *